US009263814B2

(12) United States Patent
Yoshida et al.

(10) Patent No.: US 9,263,814 B2
(45) Date of Patent: Feb. 16, 2016

(54) METAL MATERIAL FOR ELECTRICAL ELECTRONIC COMPONENT

(75) Inventors: Kazuo Yoshida, Tokyo (JP); Kyota Susai, Tokyo (JP); Takeo Uno, Tokyo (JP); Shuichi Kitagawa, Tokyo (JP); Kengo Mitose, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 529 days.

(21) Appl. No.: 12/601,866

(22) PCT Filed: May 29, 2008

(86) PCT No.: PCT/JP2008/059928

§ 371 (c)(1), (2), (4) Date: Jul. 15, 2010

(87) PCT Pub. No.: WO2008/146885

PCT Pub. Date: Dec. 4, 2008

(65) Prior Publication Data

US 2010/0304177 A1 Dec. 2, 2010

(30) Foreign Application Priority Data

May 29, 2007 (JP) ................................ 2007-142469
May 28, 2008 (JP) ................................ 2008-140186

(51) Int. Cl.

| | |
|---|---|
| ***B32B 15/01*** | (2006.01) |
| ***C25D 5/50*** | (2006.01) |
| ***H01R 13/03*** | (2006.01) |
| ***C25D 5/12*** | (2006.01) |
| ***C25D 7/00*** | (2006.01) |

(52) U.S. Cl.

CPC *H01R 13/03* (2013.01); *C25D 5/12* (2013.01); *C25D 5/50* (2013.01); *C25D 7/00* (2013.01); *Y10T 428/12458* (2015.01)

(58) Field of Classification Search

None

See application file for complete search history.

(56) References Cited

U.S. PATENT DOCUMENTS

| | | | | |
|---|---|---|---|---|
| 2003/0091855 | A1 * | 5/2003 | Tanaka et al. ................ | 428/647 |
| 2004/0229077 | A1 | 11/2004 | Mori et al. | |
| 2005/0211461 | A1 | 9/2005 | Horikoshi et al. | |
| 2007/0218312 | A1 * | 9/2007 | Sakuyama et al. ............ | 428/647 |
| 2009/0061253 | A1 * | 3/2009 | Yoshida et al. ............... | 428/632 |

FOREIGN PATENT DOCUMENTS

| | | | |
|---|---|---|---|
| EP | 2157668 | A1 | 2/2010 |
| JP | 3-202490 | A | 9/1991 |
| JP | 11-140569 | A | 5/1999 |
| JP | 2000-226645 | A | 8/2000 |
| JP | 2003-213486 | A | 7/2003 |
| JP | 2003-293187 | A | 10/2003 |
| JP | 2004-068026 | A | 3/2004 |
| JP | 2004-339555 | A | 12/2004 |
| JP | 2006-077307 | A | 3/2006 |
| JP | 2006-183068 | A | 7/2006 |
| JP | 2007-051370 | A | 3/2007 |
| WO | WO 2007097338 | A1 * | 8/2007 |

* cited by examiner

*Primary Examiner* — Adam Krupicka

(74) *Attorney, Agent, or Firm* — Kubotera & Associates, LLC

(57) ABSTRACT

A metallic material for an electrical electronic includes a CU—Sun alloy layer (2) provided on a conductive base (1). A Cu concentration of the Cu—Sn alloy layer gradually decreases from the base side to the surface (3) side.

17 Claims, 4 Drawing Sheets

METAL MATERIAL FOR ELECTRICAL ELECTRONIC COMPONENT

TECHNICAL FIELD

The present invention relates to a metallic material for an electrical electronic component suitable for a sliding portion of a fitting-type multipole connector and the like.

BACKGROUND ART

A plating material provided with a plating layer of tin (Sn), a tin alloy and others on a conductive base such as copper (Cu) and a copper alloy (referred to as a base hereinafter) is known to be a high-performance conductor having excellent conductivity and strength of the base and excellent electrical connectivity, corrosion resistance and soldering quality of the plating layer. The plating material is widely used for various terminals and connectors used in electric/electronic devices. The plating material is normally undercoated with nickel (Ni), cobalt (Co), iron (Fe) and others having a barrier function on the base to prevent an alloy component (referred to as a base component hereinafter) such as zinc (Zn) from diffusing in the plating layer.

When the plating material is used as a terminal in a high-temperature environment such as an inside of an engine room of a vehicle, for example, although an oxide coating film is formed on a surface of the Sn plating layer because the Sn plating layer on a surface of the terminal is oxidizable, the oxide coating film is brittle and breaks down when the terminal is connected and a non-oxidized Sn plating layer is exposed, thereby obtaining favorable electrical connectivity.

Because a fitting-type connector is multipolarized lately with advancement of electronic control, a considerable force is necessary for plugging a male terminal group into/out of a female terminal group. In particular, plugging such a connector is difficult in a narrow space such as the engine room of the vehicle, and it has been strongly demanded to be able to reduce the force for plugging in/out such a connector. Still more, as workability in connecting the connector is improved by reducing the force for plugging in/out the connector, it has been demanded to reduce the force for plugging in/out the connector also from this point of view.

In order to reduce the plugging-in/out force, the Sn plating layer on the surface of the connector terminal may be thinned to weaken contact pressure between the terminals. However, because the Sn plating layer is soft, a fretting phenomenon may occur between contact faces of the terminals, thereby causing inferior conduction between the terminals.

In the fretting phenomenon, the soft Sn plating layer on the surface of the terminal wears and is oxidized, becoming abrasion powder having large specific resistance, due to fine vibration between the contact faces of the terminals caused by vibration and changes in temperature. The lower the contact pressure between the terminals, the more the fretting phenomenon is prone to occur.

In order to assure a low plugging force, Japanese Patent Application Laid-Open No. 2000-226645 Gazette, for example, has proposed a method of forming a hard Cu—Sn intermetallic compound layer that hardly causes the fretting phenomenon on the outermost surface by plating Sn on Cu or a Cu alloy, implementing a reflow process and then treating by heat in an atmosphere at an oxygen concentration of 5% or less. However, the method has had a problem that workability of the plating process is inferior. Japanese Patent Application Laid-Open No. 2000-226645 Gazette has no description about a concentration of Cu—Sn in the Cu—Sn intermetallic compound layer and has had a problem that it is difficult to perform the reflow heat-process in producing in line to adequately form an oxide coating layer with a controlled thickness on the surface of the Cu—Sn intermetallic compound layer.

Further, in order to assure the low plugging force and others, Japanese Patent Application Laid-Open No. 2004-68026 Gazette describes a conductive material for a connecting component that hardly causes the fretting phenomenon, in which a surface plating layer composed of a Ni layer and a Cu—Sn alloy layer is formed on a surface of a base composed of Cu or a Cu alloy in this order. However, the material is also inferior in terms of workability of plating process. Still more, it is difficult to perform the reflow heat-process in producing in line because of the Cu—Sn alloy layer controlled by an average value of the concentration of Cu—Sn.

Japanese Patent Application Laid-Open No. 2004-339555 Gazette describes forming a metal plate layer by plating metal on a surface of a metallic base and forming a plated material mixed with soft regions spreading like a net and a hard region surround by the net of the soft region by a reflow process. However, the plated material has a problem that the Cu component in the base diffuses to the plate uppermost surface and is oxidized, further increasing a contact resistance value.

Japanese Patent Application Laid-Open No. 2006-77307 Gazette describes a conductive material for a connecting component in which a Cu—Sn alloy coating layer composed of particles of several μm in diameter is formed along irregularities of a surface of a base. Further, a Sn coating layer is melt and smoothed, and a part of the Cu—Sn alloy coating layer is exposed on the surface of the material.

When there is no Cu layer in a substrate and a Ni substrate exists, there would be no problem. However, when the Cu layer exists or no Ni substrate exists, even if there would be no problem in an initial state, under an environment in which a connecting component is mounted in an actual car and sliding and thermal loads are applied at the same time, the pure Sn portion is scraped due to sliding and Cu diffuses up to a surface and oxidized, thereby increasing resistance.

DISCLOSURE OF THE INVENTION

According to the invention, the following aspects are provided:

(1) A metallic material for an electrical electronic component comprising a Cu—Sn alloy layer provided on a conductive base, wherein the Cu—Sn alloy layer has a Cu concentration gradually decreasing from a side of the conductive base toward a surface side thereof;

(2) A metallic material for an electrical electronic component comprising a Cu—Sn alloy layer provided on a conductive base, wherein the Cu—Sn alloy layer has a Cu concentration gradually decreasing from a side of the conductive base toward a surface side thereof, and said Cu—Sn alloy layer contains Sn or a Sn alloy dispersed partially;

(3) A metallic material for an electrical electronic component comprising one layer formed of one of Ni, Co and Fe or an alloy thereof provided on a conductive base and a Cu—Sn alloy layer provided on the one layer, wherein the Cu—Sn alloy layer has a Cu concentration gradually decreasing from a side of the conductive base toward a surface side thereof;

(4) A metallic material for an electrical electronic component comprising one layer formed of one of Ni, Co and Fe or an alloy thereof provided on a conductive base and a Cu—Sn alloy layer provided on the one layer, wherein the Cu—Sn alloy layer has a Cu concentration gradually decreasing from a side of the conductive base toward a surface side thereof, and said Cu—Sn alloy layer contains Sn or a Sn alloy dispersed partially;

(5) A metallic material for an electrical electronic component two layers formed of one of Ni, Co and Fe or an alloy thereof provided on a conductive base and a Cu—Sn alloy layer provided on the two layers, wherein the Cu—Sn alloy layer has a Cu concentration gradually decreasing from a side of the conductive base toward a surface side thereof;

(6) A metallic material for an electrical electronic component comprising two layers formed of one of Ni, Co and Fe or an alloy thereof provided on a conductive base and a Cu—Sn alloy layer provided on the two layers, wherein the Cu—Sn alloy layer has a Cu concentration gradually decreasing from a side of the conductive base toward a surface side thereof, and said Cu—Sn alloy layer contains Sn or a Sn alloy dispersed partially;

(7) The metallic material for an electrical electronic component according to one of (1), (3) and (5), wherein the Cu—Sn alloy layer includes a half portion on the side of the conductive base having the Cu concentration of 50 to 100 mol % and the Sn concentration of 0 to 50 mol %, and a half portion on the surface side having the Cu concentration of 40 to 95 mol % and the Sn concentration of 5 to 60 mol %;

(8) The metallic material for an electrical electronic component according to one of (2), (4) and (6), wherein said Cu—Sn alloy layer includes a half portion on the side of the conductive base having the Cu concentration of 50 to 100 mol % and the Sn concentration of 0 to 50 mol %, and a half portion on the surface side having the Cu concentration of 0 to 95 mol % and the Sn concentration of 5 to 100 mol %;

(9) The metallic material for an electrical electronic component according to one of (1) through (8), wherein said Cu—Sn alloy layer has a thickness of 0.1 to 3.0 μm;

(10) A method for manufacturing the metallic material for an electrical electronic component according to one of (1) through (9), comprising the steps of: laminating sequentially Cu and Sn on the conductive base or one of Ni, Co and Fe or the alloy thereof to form a laminate; applying a heat treatment on the laminate; and applying a cooling process on the laminate applied with the heat treatment;

(11) The method for manufacturing the metallic material for an electrical electronic component according to (10), wherein, in the step of applying the heat treatment, the laminate passes through a reflow furnace at an in-furnace temperature of higher than 300° C. and lower than 900° C. for three to 20 seconds;

(12) The method for manufacturing the metallic material for an electrical electronic component according to (10), wherein, in the step of applying the cooling treatment, the laminate passes through a liquid at a temperature between 20° C. and 80° C. for one to 100 seconds; and

(13) The method for manufacturing the metallic material for an electrical electronic component according to (10), wherein, in the step of applying the cooling treatment, the laminate passes through air at a temperature between 20° C. and 60° C. for one to 300 seconds, and then through a liquid at a temperature between 20° C. and 80° C. for one to 100 seconds.

The abovementioned and other features and advantages of the invention will be more apparent from the following description understood by appropriately making reference to the appended drawings.

BEST MODES FOR CARRYING OUT THE INVENTION

Figure 1:
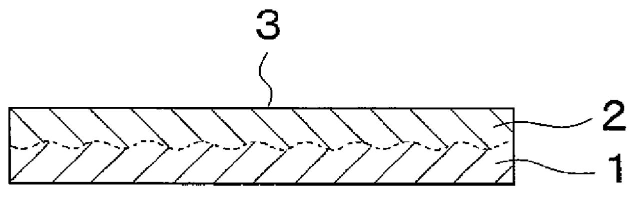
FIG. 1 is a longitudinal section view showing one mode of a metallic material for electrical electronic component the invention.

According to the present invention, a metallic material for an electrical electronic component is provided with a Cu—Sn alloy layer on a conductive base or on an undercoat formed on the conductive base and Cu concentration in the Cu—Sn alloy layer gradually decreases from the side of the base toward the side of a surface of the metal material. The metallic material for electrical electronic component is formed by forming the Cu—Sn alloy layer by plating Sn on a plating layer formed on the conductive base and by implementing a heat treatment and by decreasing the Cu concentration gradually from the base side to the surface side.

The phrase "the Cu concentration of the Cu—Sn alloy layer gradually decreases from the base side to the surface" means that the Cu concentration measured at least three places whose depth from the surface of the layer is different in section of the Cu—Sn alloy layer is low in order closer to the surface.

While the Cu concentration of the Cu—Sn alloy layer of the invention gradually decreases from the base side to the surface, the Cu concentration in a half of the base side of the thickness is preferable to be 50 to 100 mol % and is more preferable to be 65 to 100 mol % and the Sn concentration is preferable to be 0 to 50 mol % of the remaining part and more preferable to be 0 to 35 mol % (this is concentration in which inevitable impurities other than Cu and Sn are neglected. The same applies hereinafter).

In a case when Sn or the Sn alloy is not distributed partially, the Cu concentration on a half on the surface side is preferable to be 40 to 95 mol % and more preferable to be 65 to 85 mol %. The Sn concentration is preferable to be 5 to 60 mol % and more preferable to be 15 to 35 mol %.

In a case when Sn or the Sn alloy is dispersed partially, the Cu concentration in the half of the surface side is preferable to be 0 to 95 mol % and more preferable to be 65 to 85 mol %. The Sn concentration is preferable to be 5 to 100 mol % and more preferable to be 15 to 35 mol %.

If the Cu concentration in the half of the base side is too low (the Sn concentration is too high), a pure Sn layer tends to be formed on the outermost surface and fretting resistance deteriorates.

If the Sn concentration in the half of the surface side is too low, the heat resistance decreases, leading to the quick increase of resistance when used under a high-temperature environment.

The metallic material for electrical electronic component of the invention has a room for permitting Cu to diffuse with Sn even if a Cu layer exists in a substrate or no Ni substrate exists because the Cu—Sn alloy layer is what is formed so that the Cu concentration within the Cu—Sn alloy layer on the upper side in gradation, i.e., the Sn concentration is low in the Cu—Sn alloy layer on the surface side. As a result, it becomes possible to retard Cu from being exposed on the outermost surface and being oxidized even if the metallic material for electrical electronic component receives thermal load.

A thickness of the Cu—Sn alloy layer is preferably in a range from 0.1 to 3.0 μm and more preferable to be 0.3 to 1.5 μm. If this thickness is too thick, Kirkendall voids tend to be generated in a diffusion process, possibly causing delamination of plating. Still more, it is presumed that costs for plating increase due to the increase of heat-treatment temperature and time. If the thickness is too thick, the contact resistance may increase, the heat resistance may be deteriorated and the fretting resistance may be deteriorated.

In the present invention, copper and copper alloys such as phosphor bronze, brass, alpaca, beryllium copper and Corson alloy, iron and iron alloys such as stainless steel, compound materials such as copper-coated steel material and nickel-coated steel material, various nickel alloy and aluminum alloys having conductivity, mechanical strength and heat resistance required for terminals may be used for the conductive base.

Among the metals and alloys (material) described above, the copper materials such as copper and the copper alloys are suitable in particular because they excel in the balance of the conductivity and mechanical strength. If the conductive base is made of materials other than the copper material, it is preferable to coat copper or the copper alloy on the surface of the conductive base.

While the Sn plating may be formed by nonelectrolytic plating, it is desirable to form by electroplating. A thickness of the Sn layer formed by the Sn plating is preferable to be in a range from 0.01 to 5.0 μm. Sn electroplating of the uppermost layer may be carried out under conditions of 30° C. or less of plating temperature and 5 A/$cm^2$ of current density by employing tin sulfate bath for example. However, these conditions are not limited to these and may be appropriately set.

According to the invention, the laminate material whose uppermost layer is Sn-plated is treated by heat. Conditions for this heat treatment are selected so as to form the Cu—Sn alloy layer in which the Cu concentration gradually decreases from the base side to the surface side. When the heat treatment is implemented by a reflow process (continuous process), it is preferable to heat in an in-furnace temperature range of 300° C. or more to under 900° C. for three to 20 seconds (or preferably from 5 to 10 seconds or more preferably from 6 to 8 seconds).

These temperature and time are adopted to obtain the Cu—Sn alloy layer whose Cu concentration gradually decreases from the base side to the surface side.

It is noted that it is preferable to hold the material described above for 0.1 to 200 hours within a furnace whose temperature is 60 to 200° C. when the heat treatment is carried out in a way of batch process.

Still more, it is preferable to pass the laminate material treated by heat by the reflow process into liquid within a cooling tank by taking 1 to 100 seconds (or more preferably 3 to 10 seconds) to quench the material. Temperature of the liquid is preferable to be in a range from 20 to 80° C. (or more preferably 30 to 50° C.). It is also preferable to pass the laminate material treated by heat into gas of a cold-air unit within the in-furnace atmosphere of 20 to 60° C. by taking 1 to 300 seconds to gradually cool the material.

It becomes possible to obtain the plating structure in which the Cu concentration within the Cu—Sn alloy layer is gradational and to disperse pure Sn within the Cu—Sn alloy layer by forcibly ending the diffusion of Cu and Sn in mid-stream or by rapidly reducing their diffusion speed by such cooling process.

FIG. 1 is a schematic section view showing a metallic material for electrical electronic component of one embodiment of the invention. The metallic material for electrical electronic component of the mode shown in FIG. 1 is obtained by plating Sn on the conductive base 1, by treating by heat and by provided the Cu—Sn alloy layer 2 whose Cu concentration is gradually reduced from the side of the base 1 to the side of the surface (material surface) 3 for example. In this mode, the copper material or a Cu base material coated with copper or a copper alloy is used as the conductive base 1. By treating by heat as described above, Cu components of the Cu base material coated with copper or the copper alloy on the surface of the conductive base 1 thermally diffuse into the Sn plating layer and Sn also diffuses into the base 1 by the heat treatment in this mode. Due to that, the Cu—Sn alloy layer 2 whose Cu concentration is gradually reduced from the base side 1 to the surface 3 is formed. No clear boundary between the conductive base 1 and the Cu—Sn alloy layer 2 in section is also formed.

Figure 2:
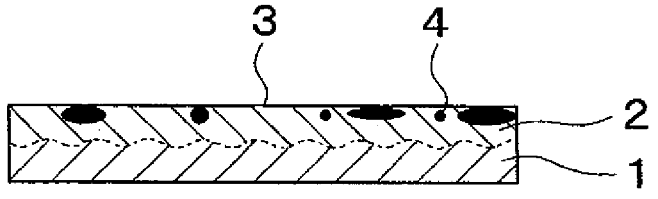
FIG. 2 is a longitudinal section view showing one mode of the metallic material for electrical electronic component the invention.

FIG. 2 is a schematic section view showing a metallic material for electrical electronic component of another one embodiment of the invention. The metallic material for electrical electronic component of the mode shown in FIG. 2 is obtained by coating the conductive base 1 with Sn plating or the like, by treating by heat to provide the Cu—Sn alloy layer 2 whose Cu concentration is gradually reduced from the side of the base 1 to the side of the surface 3 and Sn (4) is partially dispersed within the Cu—Sn alloy layer 2. The material of the conductive base 1 and the boundary between the conductive base 1 and the Cu—Sn alloy layer 2 are the same with the mode shown in FIG. 1. The Sn (4) may be metallic Sn or a Sn alloy (containing Sn by more than 50 mass %). While any method may be used for dispersing the Sn (4), the metallic Sn or the Sn alloy is dispersed by optimizing conditions of the heat treatment such as the reflow process and the batch process so that the coated Sn is not totally alloyed with the base 1 or with Cu existing on the surface thereof (specifically, the heat treatment is finished before the coated Sn is totally alloyed with the base 1 or Cu existing on the surface thereof).

The dispersion state is preferable if at least part of the metallic Sn and the Sn alloy (Sn concentration is more than 80 mol %) is exposed on the surface of the uppermost layer and Sn or the Sn alloy is dispersed like an island or a dot when seen planarly. Still more, an oxide film from 0 to 100 nm may be formed on the outermost layer.

A still other embodiment of the invention is the metallic material for electrical electronic component in which the conductive base 1 coated with any one type of metal among Ni, Co and Fe or with an alloy containing those metals as a main component (more than 50 mass %) by plating and is then treated by heat to provide the Cu—Sn alloy layer 2 whose Cu concentration is gradually reduced from the base side 1 toward the surface 3.

Figure 3:
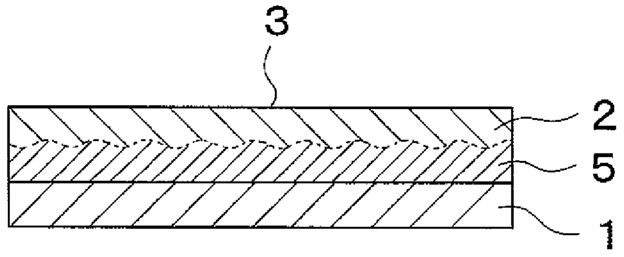
FIG. 3 is a longitudinal section view showing one mode of the metallic material for electrical electronic component the invention.

FIG. 3 is a schematic section view showing a metallic material for electrical electronic component of the present embodiment in which the conductive base 1 is coated with Cu by plating or the like. In the metallic material for electrical electronic component of the mode shown in FIG. 3, the conductive base 1 is provided with a Cu layer 5 and the Cu layer 5 is coated with Sn by plating or the like. Then, a heat treatment is implemented so that Cu components thermally diffuse from the Cu layer 5 into the Sn layer and Sn also diffuses into the Cu layer 5. Therefore, the Cu—Sn alloy layer 2 whose Cu concentration is gradually reduced from the side of the base 1 to the side of the surface 3 is formed. No clear boundary between the Cu layer 5 and the Cu—Sn alloy layer 2 in section is also formed.

Figure 4:
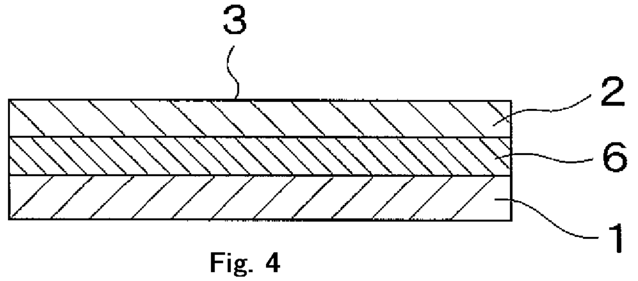
FIG. 4 is a longitudinal section view showing one mode of the metallic material for electrical electronic component the invention.

FIG. 4 is a schematic section view showing a metallic material for electrical electronic component of the present embodiment in which the conductive base 1 is plated with Ni. In the metallic material for electrical electronic component of the mode shown in FIG. 4, the conductive base 1 is coated with a Ni layer (undercoat) 6 by plating or the like and the Ni layer 6 is coated further with a Cu layer and a Sn layer in this order by plating or the like. Here, the heat treatment is implemented, so that the Cu layer provided on the Ni layer 6 and the Sn plating layer provided thereon mutually diffuse and the Cu—Sn alloy layer 2 whose Cu concentration is gradually reduced from the base side to the surface side is formed. The similar metallic material for electrical electronic component may be obtained also when Co plating or Fe plating is implemented instead of the Ni plating.

A still different embodiment of the invention is the metallic material for electrical electronic component in which the conductive base 1 coated with any one type of metal among Ni, Co and Fe or with an alloy containing those metals as a main component (more than 50 mass %) by plating or the like, is coated with Cu and Sn in this order and is then treated by heat to provide the Cu—Sn alloy layer 2 whose Cu concentration is gradually reduced from the base side 1 toward the surface 3 and Sn or the Sn alloy is partially dispersed within the Cu—Sn alloy layer 2.

Figure 5:
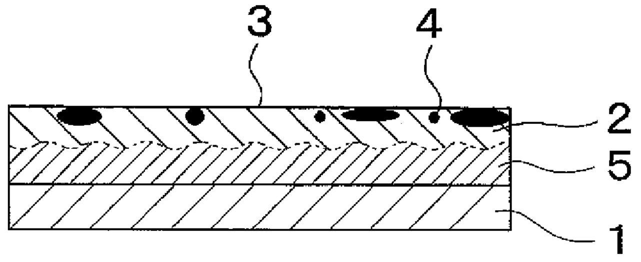
FIG. 5 is a longitudinal section view showing one mode of the metallic material for electrical electronic component the invention.

FIG. 5 is a schematic section view showing a metallic material for electrical electronic component of the present embodiment in which the conductive base 1 is coated with Cu by plating or the like. In the metallic material for electrical electronic component of the mode shown in FIG. 5, the conductive base 1 is provided with the Cu layer 5 and the Cu layer 5 is coated with Sn by plating or the like. Then, a heat treatment is implemented, so that Cu components thermally diffuse from the Cu layer 5 into the Sn layer and Sn also diffuses into the Cu layer 5. Therefore, the Cu—Sn alloy layer 2 whose Cu concentration is gradually reduced from the side of the base 1 to the side of the surface 3 is formed. No clear boundary between the Cu layer 5 and the Cu—Sn alloy layer 2 in section is formed. The Sn (4) is partially dispersed within the Cu—Sn alloy layer 2. The method for dispersing the Sn (4) is the same with the dispersing method in the mode show in FIG. 2 described above.

Figure 6:
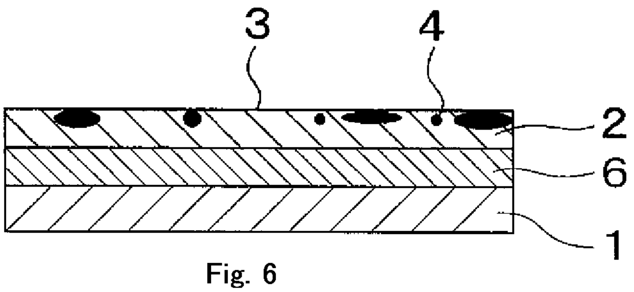
FIG. 6 is a longitudinal section view showing one mode of the metallic material for electrical electronic component the invention.

FIG. 6 is a schematic section view showing a metallic material for electrical electronic component of the present embodiment in which the conductive base 1 is plated with Ni. In the metallic material for electrical electronic component of the mode shown in FIG. 6, the conductive base 1 is coated with a Ni layer 6 by plating or the like and the Ni layer 6 is coated further with a Cu layer and a Sn layer in this order by plating or the like. Here, the heat treatment is implemented, so that the Cu layer provided on the Ni layer 6 and the Sn plating layer provided thereon mutually diffuse and the Cu—Sn alloy layer 2 whose Cu concentration is gradually reduced from the base side to the surface side is formed. The Sn (4) is partially dispersed within the Cu—Sn alloy layer 2. The method for dispersing the Sn (4) is the same with the dispersing method in the mode shown in FIG. 2 described above.

A still different embodiment of the invention is a metallic material for electrical electronic component in which the conductive base 1 coated with any one type of metal among Ni, Co and Fe or with an alloy containing those metals as a main component (more than 50 mass %) by two layers by plating or the like, is coated with Cu and Sn in this order and is then treated by heat to provide the Cu—Sn alloy layer 2 whose Cu concentration is gradually reduced from the base side 1 toward the surface 3. A combination of two types of plating implemented on the conductive base 1 is not specifically limited.

Figure 7:
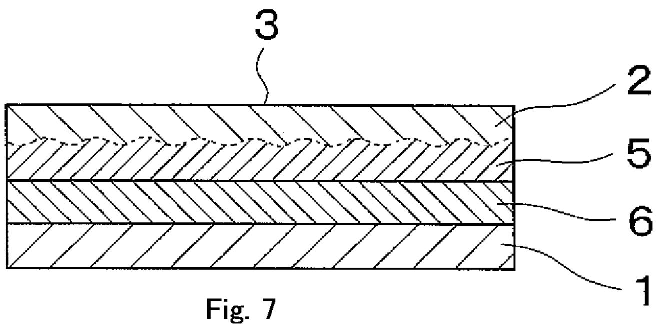
FIG. 7 is a longitudinal section view showing one mode of the metallic material for electrical electronic component the invention.

FIG. 7 is a schematic section view showing a metallic material for electrical electronic component of the present embodiment in which the conductive base 1 is coated with Ni as an under layer and with Cu as an upper layer by plating or the like. In the metallic material for electrical electronic component of the mode shown in FIG. 7, the conductive base 1 is coated with a Ni layer 6 and a Cu layer 5 in this order and the Cu layer 5 is coated further with a Sn layer by plating or the like. Here, the heat treatment is implemented, so that the Cu components thermally diffuse from the Cu layer 5 to the Sn layer and Sn also diffuses into the Cu layer 5 by the heat treatment described above. Due to that, the Cu—Sn alloy layer 2 whose Cu concentration is gradually reduced from the base side to the surface side is formed. No clear boundary between the Cu layer 5 and the Cu—Sn alloy layer 2 in section is formed.

A still other embodiment of the invention is a metallic material for electrical electronic component in which the conductive base 1 coated with any one type of metal among Ni, Co and Fe or with an alloy containing those metals as a main component (more than 50 mass %) by two layers by plating or the like, is coated with Cu and Sn in this order by plating or the like and is then treated by heat to provide the Cu—Sn alloy layer 2 whose Cu concentration is gradually reduced from the base side 1 toward the surface 3 and Sn or the Sn alloy is partially dispersed within the Cu—Sn alloy layer 2. A combination of two types of plating implemented on the conductive base 1 is not specifically limited.

Figure 8:
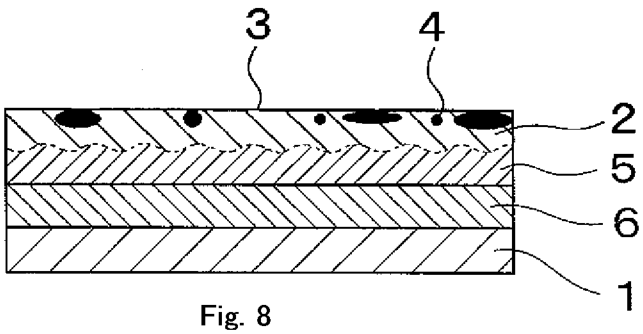
FIG. 8 is a longitudinal section view showing one mode of the metallic material for electrical electronic component the invention.

FIG. 8 is a schematic section view showing a metallic material for electrical electronic component of the present embodiment in which the conductive base 1 is coated with Ni as an under layer and with Cu as an upper layer by plating or the like. In the metallic material for electrical electronic component of the mode shown in FIG. 8, the conductive base 1 is coated with a Ni layer 6 and a Cu layer 5 in this order and the Cu layer 5 is coated further with a Sn layer by plating or the like. Here, the heat treatment is implemented, so that the Cu components thermally diffuse from the Cu layer 5 into the Sn layer and Sn also diffuses into the Cu layer 5 by the heat treatment described above. Due to that, the Cu—Sn alloy layer 2 whose Cu concentration is gradually reduced from the base side to the surface side is formed. No clear boundary between the Cu layer 5 and the Cu—Sn alloy layer 2 in section is formed. Sn (4) or the Sn alloy is partially dispersed within the Cu—Sn alloy layer 2. The method for dispersing the Sn (4) is the same with the dispersing method in the mode shown in FIG. 2 described above.

The Cu—Sn alloy layer in the outermost layer contains a Cu—Sn intermetallic compound layer in the present invention. The Cu—Sn intermetallic compound in the invention includes $Cu_6Sn_5$, $Cu_3Sn$ and others. The invention includes those in which those intermetallic compounds are mixed.

In the present invention, preferably the conductive base 1 is provided with the undercoat such as the Ni layer 6 as described in the modes shown in FIGS. 4, 6, 7 and 8. It becomes possible to prevent the components of the base 1 from diffusing into the outermost layer by providing the undercoat. As the undercoat provided on the conductive base 1, metals such as Ni, Co and Fe having a barrier function for preventing the component of the base from thermally diffusing into the outermost layer and Ni—P, Ni—Sn, Co—P, Ni—Co, Ni—Co—P, Ni—Cu, Ni—Cr, Ni—Zn, Ni—Fe and other alloys may be suitably used. These metals and alloys have favorable plating treatability and have no problem in terms of their cost. Among them, Ni and Ni alloy are recommended because their barrier function does not deteriorate even under a high-temperature environment.

While a fusion point of the metal (alloy) such as Ni used for the undercoat described above is as high as 1000° C., temperature of use environment of the connector is lower than 200° C., so that the undercoat itself hardly causes thermal diffusion and its barrier function is effectively exhibited. The undercoat also has a function of enhancing adhesion between the conductive base and an intermediate layer described later depending on a material of the conductive base. The barrier function of the undercoat is not fully exhibited if its thickness is under 0.01 μm and plating distortion thereof becomes large and the undercoat is prone to fall away if the thickness exceeds 3 μm. Accordingly, the thickness of the undercoat is preferable to be in a range from 0.01 to 3 μm. Considering a terminal workability, an upper limit of the thickness of the undercoat is preferable to be 1.5 μm or more preferable to be 0.5 μm.

The metallic material for electrical electronic component of the present invention is what the conductive base 1 is provided with the intermediate layer composed of the Cu layer 5 on the undercoat made of Ni or the like as described in the mode shown in FIGS. 7 and 8. It becomes possible to prevent the component of the undercoat such as Ni from diffusing into the outermost layer, to stably obtain favorable electrical connectivity and to readily form the Cu—Sn alloy layer whose Cu concentration is gradually reduced from the base side to the surface by providing the intermediate layer. A thickness of the intermediate layer is preferable to be 0.01 to 3 um or more preferable to be 0.1 to 0.5 μm.

The metallic material for electrical electronic component of the invention may be formed into any shape such as a strip, round wire and rectangular wire. The metallic material for electrical electronic component of the invention may be worked into an electric/electronic part such as a fitting-type multipole connector for use in automobiles by a normal method. For instance, a connector created by using the metallic material for electrical electronic component of the invention may be what weakens a contact pressure between terminals, causes no fretting phenomenon between contact faces of terminals and suppresses an occurrence of inferior conductivity between the terminals.

The metallic material for electrical electronic component of the invention may be manufactured readily by a reflow thermal treatment and may improve heat resistance of a plating material. It is because the abundant Cu on the base side reacts with the abundant Sn on the surface side within the Cu—Sn alloy layer even under a high-temperature environment when this material is used as an electric/electronic material. Still more, the electric/electronic material manufactured by using the metallic material for electrical electronic component of the invention can remarkably suppress a sharp rise of resistance (fretting) at an electrical contact during sliding.

Still more, the metallic material for electrical electronic component in which the conductive base is provided with the undercoat made of Ni or the like can prevent the components of the base from diffusing into the outermost layer. Still more, the material in which the intermediate layer made of Cu or the like is provided on the undercoat can prevent the component such as Ni of the base from diffusing into the outermost layer. Accordingly, it becomes possible to stably obtain favorable electrical connectivity.

Further, the material in which Sn or the Sn alloy is partially dispersed within the Cu—Sn alloy layer has the effect that no CuO and the like is formed by exposed Cu and the contact resistance is stabilized because there is such a room that a Cu—Sn alloy is formed as Cu existing under the Cu—Sn alloy layer reacts with Sn or the Sn alloy dispersed within the Cu—Sn alloy layer.

Embodiments

While exemplary embodiments of the invention will be explained below in detail, the invention is not limited to them.

First Exemplary Embodiment

A plated laminate was fabricated by degreasing and pickling a copper strip of 0.25 mm thick in this order and by electroplating the copper alloy strip by laminating Ni, Cu and Sn in this order. Plating of each metal was implemented under the following conditions:

(a) Ni Plating

Plating Bath Composition

| Component: | Concentration: |
|---|---|
| Nickel sulfamate | 500 g/l |
| Boric acid | 30 g/l |
| Bath Temperature: | 60° C. |
| Electrical Density: | 5 A/dm$^2$ |
| Thickness of Plating: | 0.5 μm |

(b) Cu Plating

Plating Bath Composition

| Component: | Concentration: |
|---|---|
| Copper sulfate | 180 g/l |
| Sulfuric acid | 80 g/l |
| Bath Temperature: | 40 |
| Electrical Density: | 5 A/dm$^2$ |
| Thickness of Plating: | 0.8 μm |

(c) Sn Plating

Plating Bath Composition

| Component: | Concentration: |
|---|---|
| Stannous sulfate | 80 g/l |
| sulfuric acid | 80 g/l |
| Bath Temperature: | 30° C. |

-continued

| Component: | Concentration: |
|---|---|
| Electrical Density: | 5 A/dm$^2$ |
| Thickness of Plating: | 0.3 μm |

It is noted that the thickness described above may be appropriately modified by plating time.

Figure 9:
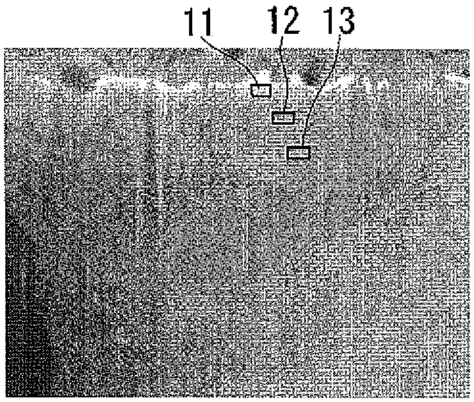
FIG. 9 is a microscope photograph, taken by a SEM, of the metallic material for electrical electronic component of a first embodiment.
Figure 10:
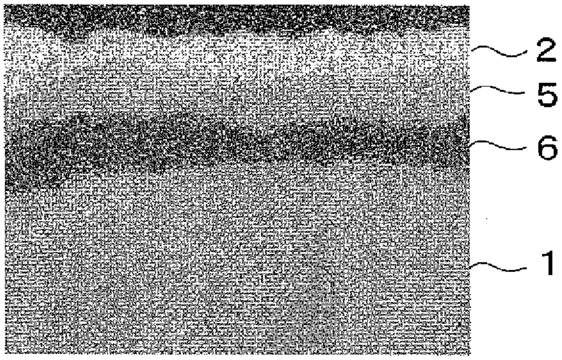
FIG. 10 is a Cu—Sn—Ni map of the first embodiment.

Next, this plated laminate was treated by a reflow process within a reflow furnace at 740° C. for 7 seconds to obtain the metallic material. FIG. 9 shows a photograph (horizontal width: 11.7 μm) of this material taken by SEM (Scanning Electron Microscope) and FIG. 10 shows an electronic image (Cu—Sn—Ni map) taken by AES (Auger Electron Spectroscopy) of a measured section containing the surface shown in the SEM photograph. This measurement was carried out by preparing a sample for AES analysis with a sample angle of 60 degrees and an oblique section of 30 degrees by FIB (Focused Ion Beam) at first, by analyzing the sample by inclining so that the oblique section of 30 degrees of the AES analysis becomes horizontal and by measuring the thickness of each layer by obtaining AES images. Table 1 shows Sn and Cu concentrations (mol %) in the respective measuring surface 1 (11), 2(12) and 3 (13) shown in FIG. 9 found by AES qualitative analysis:

TABLE 1

| MEASURING SURFACE | Sn | Cu [mol %] |
|---|---|---|
| 1 | 26.8 | 73.2 |
| 2 | 18.2 | 81.8 |
| 3 | — | 100 |

As shown in Table 1 and FIG. 10, the material of the present embodiment is formed such that the Cu layer 5 and the Cu—Sn alloy layer 2 are formed on the Ni layer 6 substantially continuously and the Cu concentration is gradually reduced from the base side toward the surface.

Second Exemplary Embodiment

A plated laminate was fabricated by degreasing and pickling a copper strip of 0.25 mm thick in this order and by electroplating the copper alloy strip by laminating Ni, Cu and Sn in this order. Plating of each metal was implemented under the following conditions:

(a) Ni Plating

Plating Bath Composition

| Component: | Concentration: |
|---|---|
| Nickel sulfamate | 500 g/l |
| Boric acid | 30 g/l |
| Bath Temperature: | 60° C. |
| Electrical Density: | 5 A/dm$^2$ |
| Thickness of Plating: | 0.5 μm |

(b) Cu Plating

Plating Bath Composition

| Component: | Concentration: |
|---|---|
| Copper sulfate | 180 g/l |
| Sulfuric acid | 80 g/l |
| Bath Temperature: | 40° C. |

-continued

| Component: | Concentration: |
|---|---|
| Electrical Density: | 5 A/dm$^2$ |
| Thickness of Plating: | 0.8 μm |

(c) Sn Plating

Plating Bath Composition

| Component: | Concentration: |
|---|---|
| Stannous sulfate | 80 g/l |
| sulfuric acid | 80 g/l |
| Bath Temperature: | 30° C. |
| Electrical Density: | 5 A/dm$^2$ |
| Thickness of Plating: | 0.5 μm |

It is noted that the thickness described above may be appropriately modified by plating time.

Figure 11:
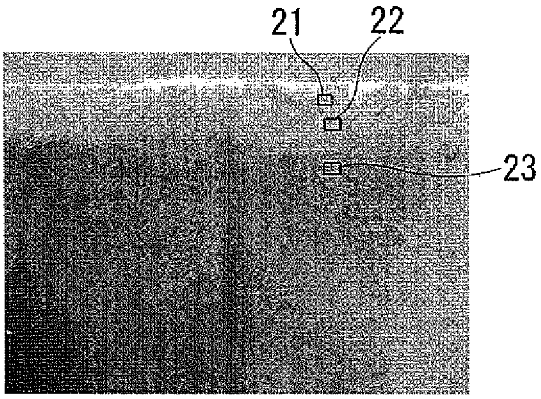
FIG. 11 is a microscope photograph, taken by the SEM, of the metallic material for electrical electronic component of a second embodiment.
Figure 12:
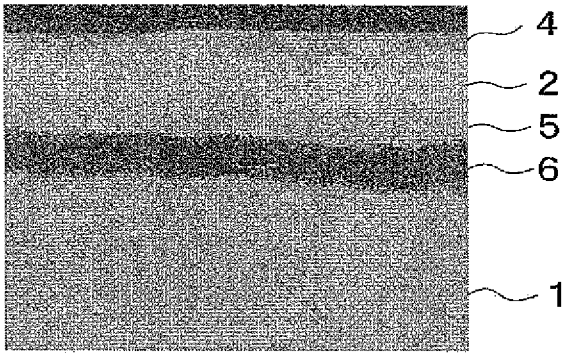
FIG. 12 is a Cu—Sn—Ni map of the second embodiment.
Figure 13:
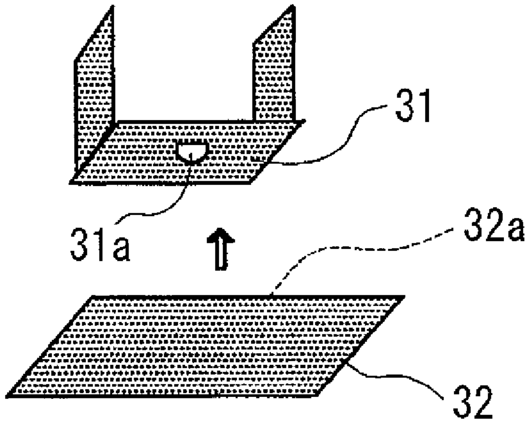
FIG. 13 is a perspective explanatory diagram of a fine vibration testing method of a test example 1.

Next, this plated laminate was heat-treated by a reflow process within a reflow furnace at 740° C. for 7 seconds to obtain the metallic material. FIG. 11 shows a photograph (horizontal width: 11.7 μm) of this material taken by SEM and FIG. 12 shows an electronic image (Cu—Sn—Ni map) taken by AES of a measured section containing the surface shown in the SEM photograph in FIG. 11. Table 2 shows Sn and Cu concentrations (mol %) in the respective measuring surface 1 (21), 2(22) and 3 (23) shown in FIG. 11 found by AES qualitative analysis:

TABLE 2

| MEASURING SURFACE | Sn | Cu [mol %] |
|---|---|---|
| 1 | 84.3 | 15.7 |
| 2 | 38.8 | 61.2 |
| 3 | — | 100 |

As shown in Table 2 and FIG. 12, the material of the present embodiment is formed such that the Ni layer 6, the Cu layer 5 and the Cu—Sn alloy layer 2 are formed on the base 1 in this order, the boundary between the Cu layer 5 and the Cu—Sn alloy layer 2 is not clear and the Cu concentration is gradually reduced from the base side toward the surface. Still more, the Sn (4) is dispersed like an island within the Cu—Sn alloy layer 2.

First Exemplary Test

The following fine sliding test was carried out on the respective metallic materials for electrical electronic component obtained in the first and second exemplary embodiments by sliding and reciprocating the material up to 1,000 times to measure changes of values of contact resistance continuously.

The fine sliding test was carried out by preparing two each pieces of testing metallic materials 31 and 32, by providing a semi-spherical bulge section (convex outer surface is the outermost layer surface) 31*a* having a radius of curvature of 1.8 mm in the testing metallic material piece 31, by contacting an outermost layer surface 32*a* of the testing metallic material piece 32 after degreasing and washing, respectively, to the semi-spherical bulge section 31*a* with contact pressure 3 N, by reciprocating and sliding the both in this state with 30 μm of a sliding distance under an environment of 20° C. of temperature and 65% of humidity, by flowing 5 mA of constant current while loading 20 mV of open voltage between the both testing metallic material pieces 31 and 32 and by finding the changes of electric resistance per one second by measuring a voltage drop during sliding by a four-terminal method. It is noted that frequency of the reciprocal movement was about 3.3 Hz. The value of contact resistance before the fine sliding test was 0.1 mΩ when the testing metallic material pieces 31 and 32 are used as the materials of the first embodiment and was 0.5 mΩ when used as the materials of the second embodiment. Further, the maximum contact resistance value during the fine sliding test was 4.0 mΩ when the testing metallic material pieces 31 and 32 are used as the materials of the first embodiment and was 4.1 mΩ when used as the materials of the second embodiment. Thus, no fretting occurred in the materials of the present embodiment.

Third Exemplary Embodiment

A plated laminate was fabricated by plating a copper alloy strip by laminating Ni, Cu and Sn in the same manner with the firs embodiment and the same heat treatment was implemented to obtain each metallic material. However, thicknesses of plating of Cu and Sn are those in the Cu—Sn layer in the following Table 3 and no Ni plating is implemented in the case when there is no undercoat Ni layer.

Each metallic material thus obtained was tested as a specimen piece and Table 3 shows their plating modes and evaluation results:

TABLE 3

| | PLATING MODE | | | | | | | | | |
|---|---|---|---|---|---|---|---|---|---|---|
| | Cu—Sn LAYER | | | | | WHETHER PURE Sn LAYER EXISTS OR NOT WITHIN UPPERMOST SURFACE | WHETHER PURE Sn PART EXISTS OR NOT WITHIN UPPERMOST SURFACE [mol %] | THICKNESS OF PURE Sn PART WITHIN UPPER-MOST SURFACE [μm] | WHETHER UNDER-COAT Ni LAYER EXISTS OR NOT | BASE |
| | | | POINT ANALYSIS OF Cu CONCENTRATION | | | | | | | |
| TEST NO. | MODE OF Cu—Sn LAYER | THICK-NESS OF WHOLE Cu-Sn LAYER [μm] | WHETHER PURE Sn EXISTS OR NOT ON SURFACE OF CONCENTRATION ANALYSIS LINE | AVERAGE OF (1) + (2) (SURFACE SIDE) [mol %] | AVERAGE OF (3) + (4) (BASE SIDE) [mol %] | | | | | |
| 1 | WHOLE SURFACE OF Cu—Sn | 0.6 | NOT EXIST | 75.9 | 81.2 | NOT EXIST | NOT EXIST | 0 | EXISTS | COPPER ALLOY |
| 2 | WHOLE SURFACE OF Cu—Sn | 0.4 | NOT EXIST | 74.9 | 80.2 | NOT EXIST | NOT EXIST | 0 | EXISTS | COPPER ALLOY |
| 3 | WHOLE SURFACE OF Cu—Sn | 0.8 | NOT EXIST | 56.9 | 66.9 | NOT EXIST | NOT EXIST | 0 | NOT EXIST | COPPER ALLOY |
| 4 | WHOLE SURFACE OF Cu—Sn | 2.4 | NOT EXIST | 84.3 | 90.5 | NOT EXIST | — | — | EXISTS | COPPER ALLOY |
| 5 | WHOLE SURFACE OF Cu—Sn | 0.2 | NOT EXIST | 68.1 | 73.7 | NOT EXIST | NOT EXIST | 0 | NOT EXIST | COPPER ALLOY |
| 6 | WHOLE SURFACE OF Cu—Sn | 0.6 | NOT EXIST | 37.8 | 53.3 | NOT EXIST | NOT EXIST | 0 | EXISTS | COPPER ALLOY |
| 7 | WHOLE SURFACE OF Cu—Sn | 0.6 | NOT EXIST | 42.6 | 48.1 | NOT EXIST | NOT EXIST | 0 | EXISTS | COPPER ALLOY |
| 8 | WHOLE SURFACE OF Cu—Sn | 0.6 | NOT EXIST | 32.3 | 44 | NOT EXIST | NOT EXIST | 0 | EXISTS | COPPER ALLOY |
| 9 | WHOLE SURFACE OF Cu—Sn | 3.5 | NOT EXIST | 86.2 | 93.6 | NOT EXIST | NOT EXIST | 0 | EXISTS | COPPER ALLOY |
| 10 | WHOLE SURFACE OF Cu—Sn | 0.05 | NOT EXIST | 77.7 | 81.9 | NOT EXIST | NOT EXIST | 0 | NOT EXIST | COPPER ALLOY |
| 11 | PARTIAL Cu—Sn | 1.1 | NOT EXIST<br>EXISTS | 66.9<br>68.3 | 84.2<br>85.4 | NOT EXIST | —<br>EXISTS 91.9 | —<br>0.2 | EXISTS | COPPER ALLOY |
| 12 | PARTIAL Cu—Sn | 1.3 | NOT EXIST<br>EXISTS | 69.1<br>70.2 | 86.7<br>87.2 | NOT EXIST | —<br>EXISTS 88.5 | —<br>0.2 | EXISTS | COPPER ALLOY |
| 13 | PARTIAL Cu—Sn | 1.6 | NOT EXIST<br>EXISTS | 51.9<br>48.4 | 69.7<br>72.8 | NOT EXIST | —<br>EXISTS 95.1 | —<br>0.3 | NOT EXIST | COPPER ALLOY |
| 14 | PARTIAL Cu—Sn | 0.4 | NOT EXIST<br>EXISTS | 65.6<br>68.8 | 85.5<br>86.7 | NOT EXIST | —<br>90.5 | 0.1 | NOT EXIST | COPPER ALLOY |

TABLE 3-continued

| | | | | | | | | | | |
|---|---|---|---|---|---|---|---|---|---|---|
| 15 | PARTIAL<br>Cu—Sn | 2.5 | NOT EXIST<br>EXISTS | 56.6<br>59.3 | 85.5<br>87.5 | NOT EXIST | —<br>EXISTS 97.2 | 0.4 | NOT<br>EXIST | COPPER<br>ALLOY |
| 16 | PARTIAL<br>Cu—Sn | 1.1 | NOT EXIST<br>EXISTS | 45.1<br>42.3 | 62.4<br>62.1 | EXISTS | —<br>EXISTS 88.5 | 0.2 | EXISTS | COPPER<br>ALLOY |
| 17 | PARTIAL<br>Cu—Sn | 3.5 | NOT EXIST<br>EXISTS | 71.3<br>69.7 | 96<br>96.7 | NOT EXIST | —<br>EXISTS 95.2 | 0.8 | EXISTS | COPPER<br>ALLOY |
| 18 | PARTIAL<br>Cu—Sn | 0.08 | NOT EXIST<br>EXISTS | 71.1<br>75.5 | 86.2<br>87.1 | NOT EXIST | —<br>EXISTS 89.7 | 0.03 | NOT<br>EXIST | COPPER<br>ALLOY |
| 19 | PURE<br>Sn ON<br>OUTERMOST<br>SURFACE | 1 | NOT EXIST | 54.3 | 81.2 | EXISTS | EXISTS 99.8 | 0.4 | EXISTS | COPPER<br>ALLOY |

| | TEST ITEM | | | | | | | | | |
|---|---|---|---|---|---|---|---|---|---|---|
| | INITIAL | | AFTER 160° C. × 120 hrs | | AFTER SPRAYING SALT WATER | | AFTER CORROSION BY GAS | | | HEAT |
| TEST NO. | APPEARANCE | CONTACT RESISTANCE | APPEARANCE | CONTACT RESISTANCE | APPEARANCE | CONTACT RESISTANCE | APPEARANCE | CONTACT RESISTANCE | FRETTING RESISTANCE | RESISTANCE AFTER SLIDING |
| 1 | ○ | ○ | ○ | ○ | ○ | ○ | ○ | ○ | ○ | ○ |
| 2 | ○ | ○ | ○ | ○ | ○ | ○ | ○ | ○ | ○ | ○ |
| 3 | ○ | ○ | ○ | ○ | ○ | ○ | ○ | ○ | ○ | ○ |
| 4 | ○ | ○ | ○ | ○ | ○ | ○ | ○ | ○ | ○ | ○ |
| 5 | ○ | ○ | ○ | ○ | ○ | ○ | ○ | ○ | ○ | ○ |
| 6 | ○ | ○ | ○ | ○ | ○ | ○ | ○ | ○ | Δ | Δ |
| 7 | ○ | ○ | ○ | ○ | ○ | ○ | ○ | ○ | Δ | Δ |
| 8 | ○ | ○ | ○ | ○ | ○ | ○ | ○ | ○ | Δ | Δ |
| 9 | ○ | ○ | Δ | Δ | ○ | ○ | ○ | ○ | ○ | Δ |
| 10 | ○ | ○ | Δ | Δ | Δ | Δ | Δ | Δ | Δ | Δ |
| 11 | ○ | ○ | ○ | ○ | ○ | ○ | ○ | ○ | ○ | ○ |
| 12 | ○ | ○ | ○ | ○ | ○ | ○ | ○ | ○ | ○ | ○ |
| 13 | ○ | ○ | ○ | ○ | ○ | ○ | ○ | ○ | ○ | ○ |
| 14 | ○ | ○ | ○ | ○ | ○ | ○ | ○ | ○ | ○ | ○ |
| 15 | ○ | ○ | ○ | ○ | ○ | ○ | ○ | ○ | ○ | ○ |
| 16 | ○ | ○ | ○ | ○ | ○ | ○ | ○ | ○ | Δ | Δ |
| 17 | ○ | ○ | Δ | Δ | ○ | ○ | ○ | ○ | Δ | Δ |
| 18 | ○ | ○ | Δ | Δ | Δ | Δ | Δ | Δ | Δ | Δ |
| 19 | ○ | ○ | ○ | ○ | ○ | ○ | ○ | ○ | × | × |

The followings are contents of items in Tables 3 and 4.

Figure 14:
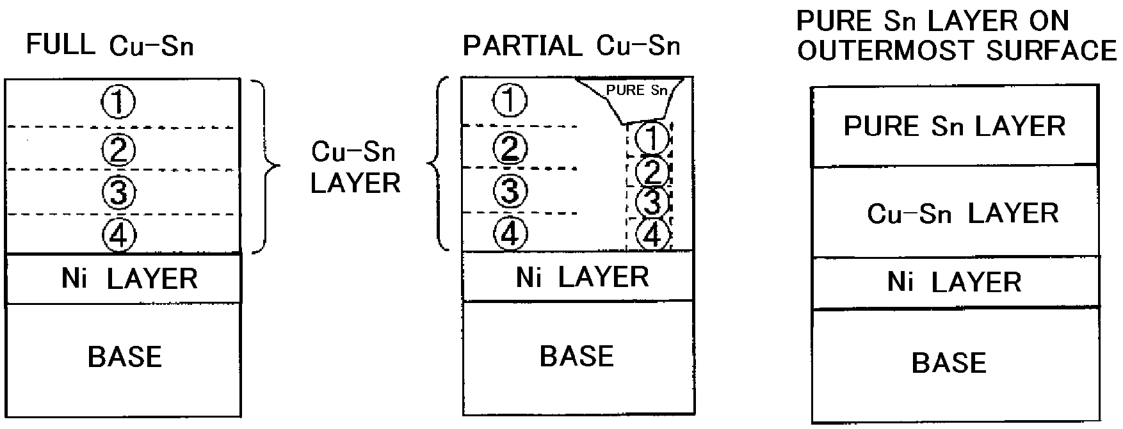
FIG. 14 is an explanatory diagram diagrammatically showing layered structures to explain sections of sample materials of third and fourth embodiments.

(a) Mode of Cu—Sn:

The whole Cu—Sn, partial Cu—Sn and pure Sn on the outermost surface mean materials having laminate structures shown diagrammatically in FIG. 14.

(b) Analysis of Copper Concentration Point:

Copper concentration of each layer of (1) through (4) shown in FIG. 14 was measured in the same manner with what described in the first embodiment.

(c) Existence of Surface Pure Sn on Concentration Analysis Line:

Existence of pure Sn on the surface of the partial layer shown in FIG. 14

(d) Initial, after 160° C.×120 hrs:

The test of the specimen was carried out in its original state or carried out after applying thermal load of 160° C.×120 hrs.

(e) After Spraying Salt Water and After Gas Corrosion:

The test was carried out after spraying salt water of 5% of concentration to the specimen or the test was carried out after corroding 96 hours within gas at 35° C.

(f) Appearance:

Those whose color did not change visually were indicated by "○ and those whose color changed were indicated by "X".

(g) Contact Resistance:

The contact resistance was measured in the same manner with the before fine sliding described in the first test example. Those whose contact resistance value is under 5 Ωm were indicated by "○", more than 5 Ωm and under 10 Ωm were indicated by "Δ" and more than 10 Ωm were indicated by "X".

(i) Heat Resistance after Sliding:

It is presumed that sliding load and thermal load are repeated in the same time or alternately when an environment in which the material is mounted in a vehicle is considered. Simulating such phenomenon, the contact resistance of the material treated by 80° C. of thermal load×100 hrs after sliding 200 times was measured. Those whose contact resistance value is under 5 Ωm were indicated by "○", more than 5 Ωm and under 10 Ωm were indicated by "Δ" and more than 10 Ωm were indicated by "X".

When the outermost surface the specimen is only pure Sn as indicated in the test No. 19 in Table 1, its fretting resistance and heat resistance after sliding are inferior. Meanwhile, it can be seen that if the Cu concentration on the surface side is lower than that on the base side like the test Nos. 1 through 16, the fretting resistance is better than that of the test No. 19. It is noted that it was confirmed that the Cu concentration gradually decreases from the base side to the surface side in the Cu—Sn alloy layer in the test Nos. 1 through 15.

It can be also seen that in the test No. 6 through 8 whose Cu concentration in the half of the base side is 50 to 100 mol % and whose Cu concentration in the half of the surface side is not in a range of 40 to 95 mol %, their fretting resistance and heat resistance after sliding are inferior as compared to the test No. 1 through 5 that are within the range. In the same manner, when pure Sn is partially dispersed within the Cu—Sn alloy layer, it can be seen that even the test No. 16 whose Cu concentration in the half of the substrate side is 50 to 100 mol % and whose Cu concentration in the half of the surface side is low has inferior fretting resistance and heat resistance after sliding as compared to the test Nos. 11 through 15 that are within the range.

The test Nos. 9, 10, 17 and 18 whose Cu—Sn alloy layer is out of the range of 0.1 to 3.0 μm have inferior fretting resistance and heat resistance after sliding as compared to the test Nos. 1 through 5 and 11 through 15 that are within the range. Further, when the thickness of the Cu—Sn layer is thicker than 3.0 μm, they are inferior than the test Nos. 1 through 15 and 11 through 15 in the test of after-thermal load of 160° C.×120 hrs as indicated by the test Nos. 9 and 17. When the thickness of the Cu—Sn layer is thinner than 0.1 μm, they are inferior not only in the test after-thermal load of 160° C.×120 hrs but also in the test after spraying salt water and after corroding by gas as indicated by the test Nos. 10 and 18.

The test Nos. 1 through 5 and 11 through 15 that fall all within the ranges described above obtained good results in all evaluation items.

Fourth Exemplary Embodiment

A plated laminate was fabricated by plating Ni, Cu and Sn on the strip of copper alloy in the same manner with the first embodiment and a heat treatment was implemented to obtain each metallic material for electrical electronic component shown in the following Table 4. However, the thicknesses of plating of Cu and Sn are thickness indicated by thicknesses of Cu and Sn in Table 4 and no Ni plating is implemented in the case when there is no undercoat Ni layer in Table 4.

Each metallic material thus obtained was tested as specimen and Table 4 shows their plating mode and evaluation results.

TABLE 4

| TEST NO. | MANUFACTURING CONDITION: DESIGNED VALUE: THICKNESS OF Sn [μm] | MANUFACTURING CONDITION: DESIGNED VALUE: THICKNESS OF Cu [μm] | MANUFACTURING CONDITION: REFLOW FURNACE: TEMPERATURE ° C. | MANUFACTURING CONDITION: REFLOW FURNACE: PASSING TIME sec | MANUFACTURING CONDITION: COOLING TANK: TEMPERATURE ° C. | MANUFACTURING CONDITION: COOLING TANK: PASSING TIME sec | PLATING MODE: Cu—Sn LAYER: MODE OF Cu—Sn LAYER | PLATING MODE: Cu—Sn LAYER: WHETHER PURE Sn EXISTS OR NOT ON SURFACE OF CONCENTRATION ANALYSIS LINE | PLATING MODE: Cu—Sn LAYER: POINT ANALYSIS OF Cu CONCENTRATION (REMAINING PART: Sn: ① SURFACE SIDE [mol %] | ② | ③ | BASE SIDE [mol %] | PLATING MODE: Cu—Sn LAYER: WHETHER PURE Sn LAYER EXISTS OR NOT WITHIN UPPERMOST SURFACE | PLATING MODE: WHETHER UNDERCOAT Ni LAYER EXISTS OR NOT |
|---|---|---|---|---|---|---|---|---|---|---|---|---|---|---|
| 21 | 0.1 | 0.1 | 650 | 7 | 40 | 7 | WHOLE SURFACE OF Cu—Sn | NOT EXIST | 65 | 71.2 | 76.1 | 82.5 | NOT EXIST | NOT EXIST |
| 22 | 0.25 | 0.15 | 650 | 15 | 35 | 15 | PARTIAL Cu—Sn | NOT EXIST<br>EXISTS | 63.1<br>65.2 | 68.1<br>72.3 | 74.5<br>76.1 | 96.5<br>97.2 | NOT EXIST | NOT EXIST |
| 23 | 0.4 | 0.4 | 700 | 8 | 50 | 8 | WHOLE SURFACE OF Cu—Sn | NOT EXIST | 52.5 | 61.3 | 72.4 | 83.3 | NOT EXIST | NOT EXIST |
| 24 | 0.2 | 0.2 | 710 | 5 | 30 | 5 | WHOLE SURFACE OF Cu—Sn | NOT EXIST | 70.5 | 79.3 | 81.1 | 82.2 | NOT EXIST | EXISTS |
| 25 | 0.3 | 0.3 | 740 | 7 | 40 | 7 | WHOLE SURFACE OF Cu—Sn | NOT EXIST | 71.4 | 80.4 | 81.9 | 82.8 | NOT EXIST | EXISTS |
| 26 | 0.5 | 0.6 | 740 | 7 | 40 | 7 | PARTIAL Cu—Sn | NOT EXIST<br>EXISTS | 65.5<br>66.4 | 68.2<br>70.1 | 70.7<br>73.5 | 97.6<br>97.3 | NOT EXIST | EXISTS |
| 27 | 0.8 | 0.9 | 760 | 12 | 60 | 12 | PARTIAL Cu—Sn | NOT EXIST<br>EXISTS | 46.5<br>41.1 | 57.3<br>55.6 | 68.1<br>66.1 | 71.3<br>79.5 | NOT EXIST | NOT EXIST |
| 28 | 0.5 | 0.8 | 780 | 7 | 40 | 7 | PARTIAL Cu—Sn | NOT EXIST<br>EXISTS | 67.1<br>68.1 | 71.1<br>72.2 | 75.2<br>76.1 | 98.1<br>98.3 | NOT EXIST | EXISTS |
| 29 | 1.3 | 1.3 | 800 | 20 | 40 | 20 | WHOLE SURFACE OF Cu—Sn | NOT EXIST | 42.1 | 48.8 | 55.6 | 63.5 | NOT EXIST | EXISTS |
| 30 | 1.3 | 1.2 | 800 | 10 | 40 | 10 | PARTIAL Cu—Sn | NOT EXIST<br>EXISTS | 51.1<br>53.5 | 62.1<br>65.1 | 74.5<br>77.8 | 96.5<br>97.2 | NOT EXIST | NOT EXIST |
| 31 | 1.1 | 0.5 | 780 | 50 | 60 | 50 | — | — | 72 | 78 | 82 | 84 | EXISTS | NOT EXIST |
| 32 | 0.5 | 0.5 | 740 | 1 | 40 | 1 | — | — | 54.1 | 85.2 | 91.1 | 98.1 | EXISTS | EXISTS |
| 33 | 0.8 | 0.8 | 380 | 10 | 50 | 10 | — | — | 61.1 | 87.5 | 91.2 | 96.4 | EXISTS | EXISTS |
| 34 | 0.7 | 0.6 | 200 | 5 | 40 | 5 | — | — | 51.1 | 82.4 | 93.5 | 99.1 | EXISTS | NOT EXIST |
| 35 | 0.9 | 0.5 | 900 | 7 | 40 | 7 | — | — | 80.5 | 82.4 | 82.6 | 83.1 | EXISTS | EXISTS |

TABLE 4-continued

| TEST NO. | TEST ITEM | | | | | | | | | |
|---|---|---|---|---|---|---|---|---|---|---|
| | INITIAL | | AFTER 160° C. × 120 hrs | | AFTER SPRAYING SALT WATER | | AFTER CORROSION BY GAS | | FRETTING RESISTANCE | HEAT RESISTANCE AFTER SLIDING |
| | APPEARANCE | CONTACT RESISTANCE | APPEARANCE | CONTACT RESISTANCE | APPEARANCE | CONTACT RESISTANCE | APPEARANCE | CONTACT RESISTANCE | | |
| 21 | ○ | ○ | ○ | ○ | ○ | ○ | ○ | ○ | ○ | ○ |
| 22 | ○ | ○ | ○ | ○ | ○ | ○ | ○ | ○ | ○ | ○ |
| 23 | ○ | ○ | ○ | ○ | ○ | ○ | ○ | ○ | ○ | ○ |
| 24 | ○ | ○ | ○ | ○ | ○ | ○ | ○ | ○ | ○ | ○ |
| 25 | ○ | ○ | ○ | ○ | ○ | ○ | ○ | ○ | ○ | ○ |
| 26 | ○ | ○ | ○ | ○ | ○ | ○ | ○ | ○ | ○ | ○ |
| 27 | ○ | ○ | ○ | ○ | ○ | ○ | ○ | ○ | ○ | ○ |
| 28 | ○ | ○ | ○ | ○ | ○ | ○ | ○ | ○ | ○ | ○ |
| 29 | ○ | ○ | ○ | ○ | ○ | ○ | ○ | ○ | ○ | ○ |
| 30 | ○ | ○ | ○ | ○ | ○ | ○ | ○ | ○ | ○ | ○ |
| 31 | ○ | ○ | ○ | ○ | ○ | ○ | ○ | ○ | × | ○ |
| 32 | ○ | ○ | ○ | ○ | ○ | ○ | ○ | ○ | × | Δ |
| 33 | ○ | ○ | ○ | ○ | ○ | ○ | ○ | ○ | × | × |
| 34 | ○ | ○ | ○ | ○ | ○ | ○ | ○ | ○ | × | Δ |
| 35 | ○ | ○ | ○ | ○ | ○ | ○ | ○ | ○ | × | ○ |

While it can be seen that the Cu concentration gradually decreases from the base side to the surface side in all of the tested items, the degree of decrease of the test No, 35 whose heating temperature is as high as 900° C. is small. The fretting resistance of the test Nos. 31 through 35 having the pure Sn layer on the outermost surface is inferior. Still more, the test Nos. 32 and 34 whose heating and cooling times are short have inferior heat resistance after sliding.

INDUSTRIAL APPLICABILITY

The metallic material for electrical electronic component of the invention may be readily manufactured and may be suitably used for a connecting or sliding portion of a connector terminal.

While the invention has been described with its modes, the inventors have no intention of limiting any detail of the explanation of the invention unless specifically specified and consider that the invention should be construed widely without going against the spirit and scope of the invention indicated by the scope of the appended Claims.

This application claims priority from Japanese patent application Nos. 2007-142469 filed on May 29, 2007 and 2008-140186 filed on May 28, 2008. The entire contents of which are incorporated herein by reference.

The invention claimed is:

1. A metallic material for an electrical electronic component comprising a Cu—Sn alloy layer provided on a conductive base, wherein said Cu—Sn alloy layer has a Cu concentration gradually decreasing from a side of the conductive base toward a surface side thereof, said Cu—Sn alloy layer has a thickness of 0.1 to 3.0 μm, and said Cu—Sn alloy layer exists as the outermost surface of the metallic material, wherein said Cu—Sn alloy layer includes a half portion on the side of the conductive base having the Cu concentration of 65 to 100 mol % and the Sn concentration of 0 to 35 mol %, and a half portion on the surface side having the Cu concentration of 65 to 85 mol % and the Sn concentration of 15 to 35 mol %.

2. The metallic material for an electrical electronic component according to claim 1, wherein said Cu—Sn alloy layer contains Sn or a Sn alloy dispersed partially.

3. The metallic material for an electrical electronic component according to claim 2, further comprising one layer composed of Ni, Co, Fe, or an alloy thereof provided on the conductive base, said Cu—Sn alloy layer being provided on the one layer.

4. The metallic material for an electrical electronic component according to claim 2, further comprising two layers composed of Ni, Co, Fe, or an alloy thereof provided on the conductive base, said Cu—Sn alloy layer being provided on the two layers.

5. The metallic material for an electrical electronic component according to claim 1, further comprising one layer composed of Ni, Co, Fe, or an alloy thereof provided on the conductive base, said Cu—Sn alloy layer being provided on the one layer.

6. The metallic material for an electrical electronic component according to claim 1, further comprising two layers composed of Ni, Co, Fe, or an alloy thereof provided on the conductive base, said Cu—Sn alloy layer being provided on the two layers.

7. The metallic material for an electrical electronic component according to claim 1, wherein the Cu—Sn alloy layer has a thickness of 0.3 to 1.5 μm.

8. A method for manufacturing a metallic material for an electrical electronic component, comprising the steps of:

laminating sequentially Cu and Sn on a conductive base directly or via a layer composed Ni, Co, Fe, or an alloy thereof, to form a laminate;

applying a heat treatment on the laminate; and applying a cooling treatment on the laminate treated with the heat treatment, wherein the. metallic material comprises a Cu—Sn alloy layer provided on the conductive base, said Cu—Sn alloy layer has a thickness of 0.1 to 3.0 μm, said Cu—Sn alloy layer exists as the outermost surface, of the metallic material, and said Cu—Sn alloy layer has a Cu concentration gradually decreasing from a side of the conductive base toward a surface side thereof, and said Cu—Sn alloy layer includes a half portion on the side of the conductive base having the Cu concentration of 65 to 100 mol % and the Sn concentration of 0 to 35 mol %, and a half portion on the surface side having the Cu concentration of 65 to 85 mol % and the Sn concentration of 15 to 35 mol %.

9. The method for manufacturing the metallic material for an electrical electronic component according to claim 8, wherein, in the step of applying the heat treatment, said laminate passes through a reflow furnace at an in-furnace temperature of not lower than 300° C. and lower than 900° C. over 3 to 20 seconds.

10. The method for manufacturing the metallic material for an electrical electronic component according to claim 9, wherein, in the step of applying the cooling treatment, said laminate passes through a liquid at a temperature between 20° C. and 80° C. over 1 to 100 seconds.

11. The method for manufacturing the metallic material for an electrical electronic component according to claim 9, wherein, in the step of applying the cooling treatment, said laminate passes through a gas at a temperature between 20° C. and 60° C. over 1 to 300 seconds, and then through a liquid at a temperature between 20° C. and 80° C. over 1 to 100 seconds.

12. The method for manufacturing the metallic material for an electrical electronic component according to claim 8, wherein the step of applying the cooling treatment forcibly ends the diffusion of Cu and Sn in the mid-course of the diffusion thereof or rapidly reduces the diffusion speed of Cu and Sn.

13. The method for manufacturing the metallic material for an electrical electronic component according to claim 8, wherein, in the step of applying the cooling treatment, said laminate passes through a liquid at a temperature between 20° C. and 80° C. over 1 to 100 seconds.

14. The method for manufacturing the metallic material for an electrical electronic component according to claim 8, wherein, in the step of applying the cooling treatment, said laminate passes through a gas at a temperature between 20° C. and 60° C. over 1 to 300 seconds, and then through a liquid at a temperature between 20° C. and 80° C. over 1 to 100 seconds.

15. The method for manufacturing the metallic material for an electrical electronic component according to claim 8, wherein the Cu and Sn layer are formed by plating.

16. The method for manufacturing the metallic material for an electrical electronic component according to claim 15, wherein the Sn layer has a thickness of 0.01 to 5.0 μm.

17. The method for manufacturing the metallic material for an electrical electronic component according to claim 8, wherein the Sn layer is formed by electroplating.

* * * * *